US008047428B2

(12) United States Patent
Kong et al.

(10) Patent No.: US 8,047,428 B2
(45) Date of Patent: Nov. 1, 2011

(54) CASH TRANSACTION MACHINE

(75) Inventors: Je Seok Kong, Busan (KR); Kyoung Bin Im, Gyeonggi-do (KR); Won Joon Lee, Seoul (KR); Jin Hwan Cha, Gyeonggi-do (KR); Young Il Choi, Seoul (KR)

(73) Assignee: Nautilus Hyosung Inc., Seoul (KR)

( * ) Notice: Subject to any disclaimer, the term of this patent is extended or adjusted under 35 U.S.C. 154(b) by 398 days.

(21) Appl. No.: 12/342,676

(22) Filed: Dec. 23, 2008

(65) Prior Publication Data

US 2009/0166957 A1 Jul. 2, 2009

(30) Foreign Application Priority Data

Dec. 28, 2007 (KR) ........................ 10-2007-0140850
Dec. 28, 2007 (KR) ........................ 10-2007-0140851

(51) Int. Cl.
*G06Q 40/00* (2006.01)
*G07D 11/00* (2006.01)
*G07F 19/00* (2006.01)

(52) U.S. Cl. ......................... 235/379; 235/375; 235/487

(58) Field of Classification Search .................. 235/379, 235/375, 381, 487, 479; 705/45, 43
See application file for complete search history.

(56) References Cited

U.S. PATENT DOCUMENTS

| | | | | |
|---|---|---|---|---|
| 6,715,671 | B2 * | 4/2004 | Abe et al. | 235/379 |
| 2004/0178569 | A1 * | 9/2004 | Graef et al. | 271/264 |
| 2006/0012101 | A1 * | 1/2006 | Katou et al. | 271/3.12 |
| 2007/0071302 | A1 * | 3/2007 | Jones et al. | 382/135 |

FOREIGN PATENT DOCUMENTS

| | | |
|---|---|---|
| KR | 2005-71234 | 7/2005 |
| KR | 2006-129647 | 12/2006 |
| KR | 2007-115649 | 12/2007 |
| KR | 2009-67356 | 6/2009 |

* cited by examiner

*Primary Examiner* — Edwyn Labaze
(74) *Attorney, Agent, or Firm* — Fenwick & West LLP

(57) ABSTRACT

Provided is a cash transaction machine including a temporary stack portion. The cash transaction machine includes: a carriage receiving a paper medium stacked in the temporary stack portion; a driving belt transferring the carriage to a medium outlet; a pressing belt pressing the paper medium being transferred by the carriage in interoperation with the driving belt; a plurality of guide rollers being provided along a travel path of the carriage to define a travel path of the driving belt and a travel path of the pressing belt; and a one-way clutch adjusting an interoperating state between the driving belt and the pressing belt to prevent a friction from occurring between the pressing belt and the paper medium while the paper medium is being loaded to the carriage.

16 Claims, 11 Drawing Sheets

CASH TRANSACTION MACHINE

CROSS-REFERENCE TO RELATED APPLICATIONS

This application claims the benefit of Republic of Korea Patent Application No. 10-2007-0140850, filed on Dec. 28, 2007, and Republic of Korea Patent Application No. 10-2007-0140851, filed on Dec. 28, 2007, in the Korean Intellectual Property Office, the disclosures of which are incorporated herein by reference.

BACKGROUND

1. Field of the Invention

The present invention relates to a cash transaction machine, and more particularly, to a cash transaction machine that may temporarily store, in a temporary stack portion, a paper medium that is supplied in a sheet unit and then may collectively discharge the stored paper media.

2. Description of the Related Art

A cash transaction machine denotes an automated device that may provide basic financial services such as deposit and withdrawal in association with financial services, without a need of a banking teller and without a restriction on a time and an occasion.

The cash transaction machine may be generally classified into a cash withdrawing device and a cash depositing device according to deposit and withdrawal. Currently, the cash transaction machine is being used for various purposes such as depositing/withdrawing of a check, a bankbook arrangement, depositing of a gyro, ticketing, and the like.

Generally, the cash transaction machine may pick up and transfer a paper medium in a sheet unit from a paper medium storage portion. The transferred paper medium may be directly moved to a dispensing portion, or may be temporarily stored in a temporary stack portion and then be moved to the dispensing portion. When using the temporary stack portion, the paper medium may be provided to a customer in a stack unit.

However, in this case, paper media stored in the temporary stack portion may need to be arranged to be transferable to a transfer module. The transfer module for transferring the paper media in a stack unit may need to transfer a single sheet of paper medium or a stack of paper media. Therefore, the transfer module may need to transfer the stack of paper media with appropriately pressing the stack of paper media.

Also, due to a friction between a pressing member and media stored in the temporary stack portion that may occur in pressing the media, the media may be transferred in a state where the media is not well arranged.

SUMMARY

An aspect of the present invention provides a cash transaction machine that may maintain a stacked state of paper media when transferring the paper media in a stack unit.

According to an aspect of the present invention, there is provided a cash transaction machine including a temporary stack portion, the cash transaction machine including: a carriage receiving a paper medium stacked in the temporary stack portion; a driving belt transferring the carriage to a medium outlet; a pressing belt pressing the paper medium being transferred by the carriage in interoperation with the driving belt; a plurality of guide rollers being provided along a travel path of the carriage to define a travel path of the driving belt and a travel path of the pressing belt; and a one-way clutch adjusting an interoperating state between the driving belt and the pressing belt to prevent a friction from occurring between the pressing belt and the paper medium while the paper medium is being loaded to the carriage.

Here, when the carriage moves forward towards the medium outlet, the one-way clutch may control the pressing belt to be in an idle state. When the carriage moves backward from the medium outlet, the one-way clutch may control the pressing belt to be driven together with the driving belt.

Through the above configuration, while paper media stacked in the temporary stack portion is being loaded to the carriage, or while the carriage loaded with the stacked paper media is moving forward towards the medium outlet, it is possible to prevent an excessive friction from occurring between the pressing member and the paper media.

Also, the plurality of guide rollers may include a front fixed roller, a rear fixed roller, and a front moving roller that is vertically swiveled with maintaining a predetermined distance from the front fixed roller. The front moving roller may upwardly and downwardly move in correspondence to forward or backward of the carriage. Since the plurality of guide rollers is provided, it is possible to form the travel path of the carriage and the travel path of the driving belt. Also, since the front moving roller may upwardly and downwardly move, the carriage may move forward to the medium outlet without an interruption of the front moving roller.

The pressing belt may be provided in parallel with the driving belt at a predetermined interval. Each of the driving belt and the pressing belt may be provided in two or more rows. This is to match the entire width corresponding to the lengthwise direction of paper media and a disposition width of the driving belt and the pressing belt to thereby prevent both ends of paper media from being protruded from the carriage.

Also, the carriage may be synchronized with the driving belt to move together with the driving belt.

Also, the cash transaction machine may further include a stopper retrieving paper media loaded in the carriage that is moving backward from the medium outlet. The stopper may separate uncollected paper media from the carriage.

The stopper may be positioned in a path defined by the driving belt to perform a pivot motion in a forward direction of the carriage. Accordingly, when the carriage is moving forward, the paper media loaded in the carriage may not be stopped by the stopper. When the carriage is moving backward, the paper media loaded in the carriage may be stopped by the stopper.

According to another aspect of the present invention, there is provided a cash transaction machine including: a medium storage portion; a medium transfer module transferring a paper medium in a sheet unit from the medium storage portion; a temporary stack portion comprising an upwardly and downwardly movable supporter that is provided to be adjacent to an outlet of the medium transfer module to stack the paper medium; a carriage receiving the paper medium from the supporter; a driving belt transferring the carriage to a medium outlet; and a pressure preventing portion preventing the paper medium from being pressed by the driving belt while the paper medium stacked in the supporter is being loaded to the carriage.

Through the above configuration, while paper media stacked in the supporter of the temporary stack portion is being transferred to the carriage, it is possible to prevent a friction from occurring between the driving belt and the paper media and to maintain the stacked state of paper media.

When the pressure preventing portion is a roller member formed in the supporter, it may be effective. Specifically, it is possible to prevent damage to the driving belt by the pressure preventing portion by forming an end portion of the pressure preventing portion to be round or to be readily rotatable.

Also, the temporary stack portion may include a stack driving unit and a stack elevator transferring the supporter from the outlet of the medium transfer module to a path defined by the driving belt using the stack driving unit. The roller member may make a contact with the driving belt when the supporter is moved up by the stack elevator. Specifically, when the temporary stack portion is moved up, the paper media may be transferred to the carriage. In this case, a friction between the driving belt and the paper media may need to be prevented.

According to still another aspect of the present invention, there is provided a cash transaction machine including: a medium storage portion; a medium transfer module transferring a paper medium in a sheet unit from the medium storage portion; a temporary stack portion comprising an upwardly and downwardly movable supporter that is provided to be adjacent to an outlet of the medium transfer module to stack the paper medium; a carriage receiving the paper medium from the supporter; a driving belt being synchronized with the carriage to transfer the carriage to a medium outlet and being downwardly inclined along a forward direction of the carriage; and a plurality of guide rollers being provided along a travel path of the carriage to define a travel path of the driving belt. A roller member may be formed in the supporter to prevent the paper medium from being excessively pressed by the driving belt or to prevent a friction from occurring between the driving belt and the paper medium, while the paper medium stacked in the supporter is being loaded to the carriage.

BRIEF DESCRIPTION OF THE DRAWINGS

These and/or other aspects, features, and advantages of the invention will become apparent and more readily appreciated from the following description of exemplary embodiments, taken in conjunction with the accompanying drawings.

DETAILED DESCRIPTION

Figure 1:
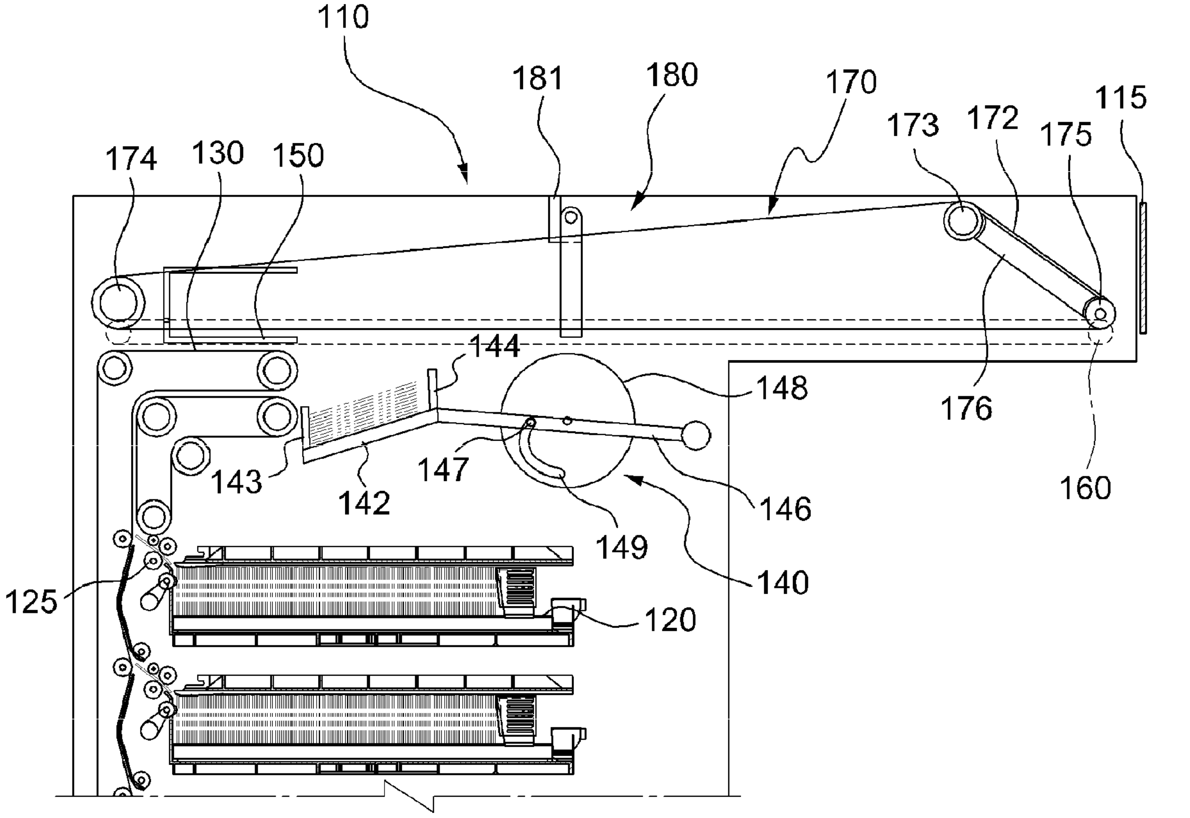
FIG. 1 is a cross-sectional view illustrating a cash transaction machine according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 2:
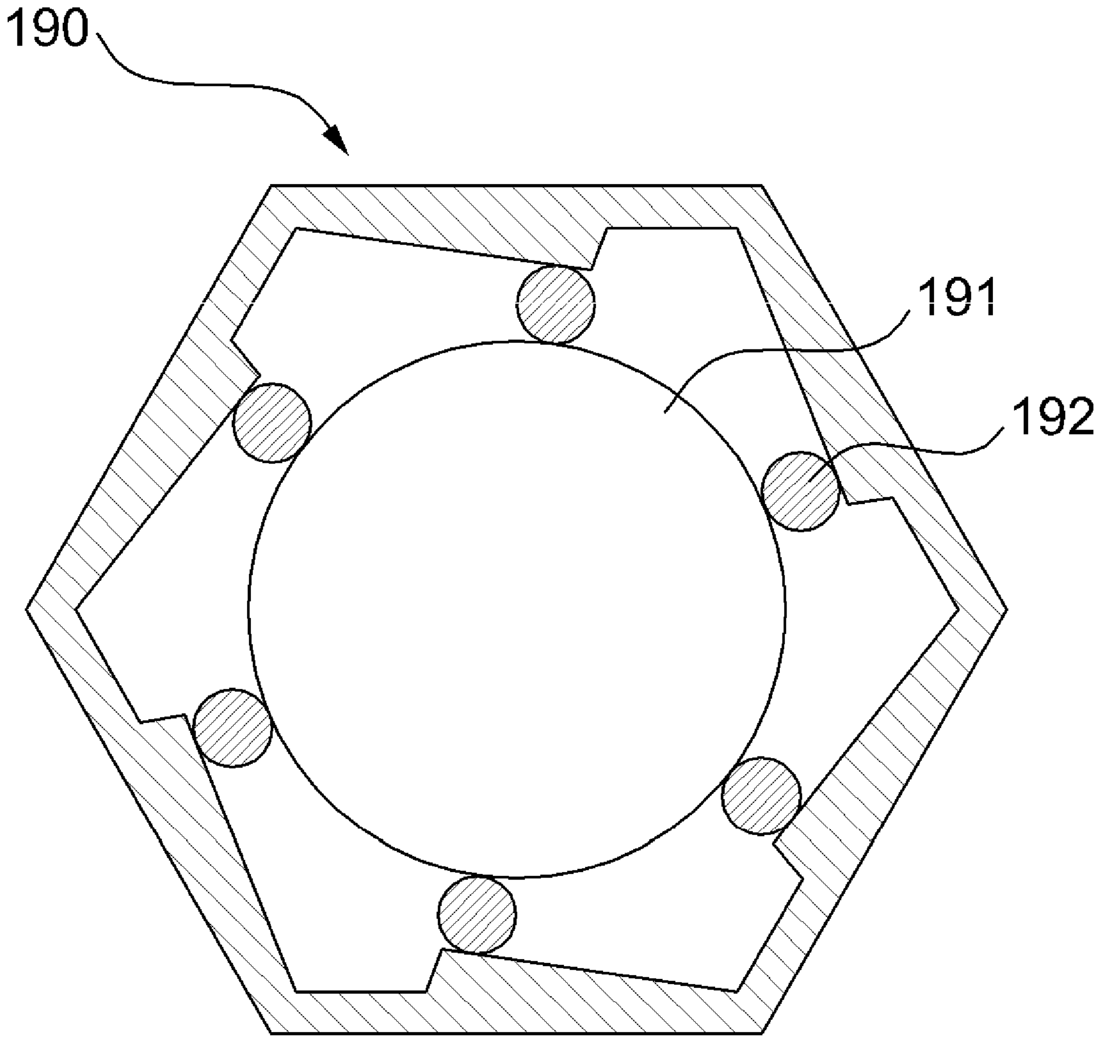
FIG. 2 is a view illustrating an embodiment of a one-way clutch used in the cash transaction machine of FIG. 1.

FIG. 1 is a cross-sectional view illustrating a cash transaction machine according to an embodiment of the present invention, and FIG. 2 is a view illustrating an embodiment of a one-way clutch used in the cash transaction machine of FIG. 1.

Referring to FIG. 1, the cash transaction machine includes a medium storage portion 120, a medium transfer module 130, a temporary stack portion 140, a carriage 150, a driving belt 160 for transferring the carriage 150, and a belt pressing portion 170 for pressing a paper medium, which are provided in a housing 110.

The paper medium may be picked up and be supplied in a sheet unit from the medium storage portion 120. The supplied paper medium may be transferred to the temporary stack portion 140 via the medium transfer module 130. Paper media may be supplied in the sheet unit and be stacked in the temporary stack portion 140. When paper media is stacked as many sheets as a customer desires to withdraw, a bundle or a stack of paper media stacked in the temporary stack portion 140 may be transferred to the carriage 150. The stack of paper media transferred to the carriage 150 may move to a medium outlet 115 together with the carriage 150. The customer may collect the paper media from the medium outlet 115 in a stack unit.

In this instance, the belt pressing portion 170 may press a top surface of stacked paper media being transferred by the carriage 150. While the paper media is being transferred for payment of the paper media, or while the paper media is not collected by the customer and thus is being retrieved, the belt pressing portion 170 may press the paper media so that the paper media may not be dispersed and may maintain its arranged state. Hereinafter, a function of each constituent element will be further described in detail.

The medium storage portion 120 may maintain a paper medium such as a check, a bill, a gift, a ticket, and the like. When the customer desires to withdraw a predetermined number of paper media, a main controller (not shown) of the cash transaction machine may order the predetermined number of paper media to be discharged from maintained paper media.

A pickup module 125 may be provided, as an internal type or as an external type, in the medium storage portion 120. The pickup module 125 may pick up the predetermined number of paper media from the medium storage portion 120 in a sheet unit, that is, one by one. Generally, the pickup module 125 may include a pickup roller, a feed roller, a gate roller, a pinch roller, and the like. Those skilled in the art may readily understand a configuration and a function thereof and thus further detailed description related thereto will be omitted here.

A paper medium picked up and supplied from the medium storage portion 120 may be transferred to the temporary stack portion 140 via the medium transfer module 130. In the present embodiment, although the medium transfer module 130 adopts a transfer scheme consisting of a belt and a roller, the medium transfer module 130 may transfer the paper medium according to a transfer scheme using a roller and a guide plate depending on embodiments. The temporary stack portion 140 may be provided to be adjacent to an outlet of the medium transfer module 130. The paper medium may be stacked in the sheet unit in the temporary stack portion 140.

Referring to FIG. 1, the temporary stack portion 140 includes a supporter 142, a front wall 144, a rear wall 143, and a stack elevator. The stack elevator includes a rotation supporter 146 and a rotation guide 148 that performs a cam function. The supporter 142 and the rotation supporter 146 may be integrally formed, and upwardly and downwardly move through a rotary motion of the rotation supporter 146. Specifically, the supporter 142 may be positioned to be adjacent to the outlet of the medium transfer module 130 and may also be positioned in an upwardly moved location for transfer of the carriage 150.

A stack driving unit (not shown) such as a motor and the like may be provided to drive the rotation guide 148.

The front wall 144 and the rear wall 143 may be provided in a front end and a rear end of the supporter 142, respectively. The front wall 144 may stop an advancement of the paper medium being discharged from the medium transfer module 130. When a sheet roller (not shown) is provided in the outlet of the medium transfer module 130, the paper medium may temporarily maintain its stopped state by the front wall 144 and then may be guided to be moved down by the sheet roller. The rear wall 143 may guide paper media to be stacked on the supporter 142 in an arranged state. The supporter 142 may be provided to be downwardly inclined in front of the outlet of the medium transfer module 130.

As shown in the figures, a spiral guide groove 149 having a different radius upon a rotation angle may be formed in the rotation guide 148. A protrusion 147 may be formed in the rotation supporter 146 to be coupled with the guide groove 149. Accordingly, when the rotation guide 148 rotates clockwise based on the figure, the rotation supporter 146 may be moved up. Conversely, when the rotation guide 148 rotates counterclockwise based on the figure, the rotation supporter 146 may be moved down.

Although the present embodiment provides the temporary stack portion 140 constructed as above, the present invention is not limited thereto. Specifically, various types of temporary stack portions may be provided. Also, those skilled in the art may variously select and use a device for elevating the supporter 142 in the related art.

The carriage 150 may be provided in the structure to be partially overlapped with the supporter 142 of the temporary stack portion 140. Generally, the carriage 150 may be provided in a fork shape including a plurality of supporters. When the supporter 142 is moved up to be positioned in an upper location, the carriage 150 may move forward whereby a lower portion of the carriage 150 may be inserted into the supporter 142 to be positioned below the stacked paper media.

The belt pressing portion 170 may be provided above the carriage 150 or both sides of the carriage 150. The belt pressing portion 170 may press a top surface of the paper medium or a stack of paper media while the carriage 150 is being transferred. The belt pressing portion 170 may enable the paper media to be transferred in a well-arranged state.

For this, the belt pressing portion 170 includes a pressing belt 172 for simultaneously transferring the carriage 150 and pressing the top surface of paper media in the entire moving section of the carriage 150 and a plurality of guide rollers for defining a travel path of the pressing belt 172. Two or more rows of pressing belts 172 may be provided in order to stably press the paper media.

The plurality of guide rollers may include a front fixed roller 173, a rear fixed roller 174, and a front moving roller 175 that is vertically swiveled with maintaining a predetermined distance from the front fixed roller 173. A support member 176 may be interposed between the front fixed roller 173 and the front moving roller 175.

Specifically, the support member 176 may be mounted on a rotation shaft of the front fixed roller 176. The front moving roller 175 may be rotatably mounted on an end of the support member 176. Accordingly, the front moving roller 175 may be vertically swiveled together with the support member 176. When the carriage 150 approaches the front moving roller 175, the front moving roller 175 may be moved up together with the support member 176. Conversely, when the carriage 150 is withdrawn from the front moving roller 175, the front moving roller 175 may be moved down.

The pressing belt 172 may be stopped without regard to the carriage 150 and may also move by the same displacement as that of movement of the carriage 150 in order to reduce a friction between the pressing belt 172 and the paper media. For this, the pressing belt 172 or the guide rollers 173, 174, and 175 may interoperate with the driving belt 160 for transferring the carriage 150. Various types of schemes may be used for interoperation between the driving belt 160 and the pressing belt 172.

For example, a separate driving belt interoperating with the belt pressing portion 170 may be mounted on each of both sides of the pressing belt 172. The carriage 150 may be fixed onto the externally mounted driving belt 160 and thereby may move together with the driving belt 160.

In this instance, the pressing belt 172 may be in a free rotation state or in an idle state and thereby be circulated together with the paper medium.

A rotation shaft of the pressing belt 172 and a rotation shaft of the driving belt 160 may be connected to each other via a one-way clutch 190. Specifically, by mounting the rotation shaft of the pressing belt 172 on a rotation shaft mounting hole 191 of the one-way clutch 190 shown in FIG. 2, the pressing belt 172 may be in the idle state when the carriage 150 moves forward towards the medium outlet 115. When the carriage 150 moves backward from the medium outlet 115, the driving belt 160 and the pressing belt 172 may move together.

Referring to FIG. 1, the rotation shaft of the pressing belt 172 and the rotation shaft of the driving belt 160 may rotate on the same shaft. The one-way clutch 190 of FIG. 2 may be interposed between a pulley and the shaft for the pressing belt 172. According to another embodiment of the present invention, a pulley shaft for rotating a pressing belt may be different from a pulley shaft for rotating a driving belt.

More specifically, when the carriage 150 moves forward towards the medium state 115 in a state where a stack of paper media is loaded in the carriage 150, a drive force may be directly transferred to only the driving belt 160 and the drive force may not be transferred to the pressing belt 172. Accordingly, when the carriage 150 moves forward, the pressing belt 172 may be in the idle state due to a friction between the top surface of paper media and the pressing belt 172.

However, when, without using the one-way clutch 190, the driving belt 160 is driven to enable the carriage 150 to receive a stack of paper media loaded in the supporter 142, the pressing belt 172 may also be driven. Accordingly, while the paper media is being loaded to the carriage 150, a friction may occur between the pressing belt 172 and the paper media whereby the stack of paper media may be transferred from the supporter 142 to the carriage 150 in a not-arranged state.

The force for transferring the stack of paper media to the medium outlet 115 may be only the force of the carriage 150 and the driving belt 160. The pressing belt 172 functions to simply press the stack of paper media. Specifically, to transfer the stack of paper media is not because of the friction between the pressing belt 172 and the paper media.

When the carriage 150 moves backward from the medium outlet 115, the driving belt 160 and the pressing belt 172 may be driven together. When the carriage 150 moves backward, paper media may not be withdrawn or collected by a customer and thereby remain in the carriage 150. In this case, if the pressing belt 172 is in the idle state, the paper media loaded in the carriage 150 may be dispersed.

The one-way clutch 190 is in a bearing shape with a plurality of balls 192 and uses a general operation principle. Accordingly, further detailed descriptions related thereto will be omitted here. The one-way clutch 190 of FIG. 2 is only an example and thus the present invention is not limited thereto.

For another example, there is a scheme of directly fixing a pressing belt and a carriage. The pressing belt may function as a driving belt and thus there is no need to mount a separate driving belt in addition to the pressing belt.

When the uncollected paper media remains in the carriage 150, the paper media may need to be separated from the carriage 150 and be retrieved. For this, a stopper 180 may be provided in a travel path of the carriage 150.

Referring to FIG. 1, the stopper 180 may be provided in the housing 110 to be positioned in the travel path defined by the driving belt 160 and may perform a pivot motion along the forward direction of the carriage 150. Specifically, when the carriage 150 moves forward, a paper medium loaded in the carriage 150 may not be stopped by the stopper 180. When the carriage 150 moves backward, the paper medium loaded in the carriage 150 may be stopped by the stopper 180. Through this, the paper medium may be separated from the carriage 150.

The separated paper medium may be collected in a separately mounted retrieval box (not shown). In this instance, the retrieval box may be provided below the stopper 180.

So that the stopper 180 may perform the pivot motion only in the forward direction of the carriage 150, an upper end of the stopper 180 may be connected to the housing 110 via a hinge. A fixing member 181 may be separately mounted onto one side of the stopper 180 to thereby prevent the stopper 180 from performing the pivot motion when the carriage 150 moves backward.

The stopper 180 may be in the structure of preventing interference with the carriage 150. A lower end of the stopper 180 may be partially overlapped with a medium holding surface of the carriage 150. In this instance, an interference preventing portion (not shown) may be provided in the carriage 150 to prevent a collision or contact between the lower end of the stopper 180 and the carriage 150.

Hereinafter, an operation of a cash transaction machine according to an embodiment of the present invention will be described with reference to FIGS. 3 through 6.

Figure 3:
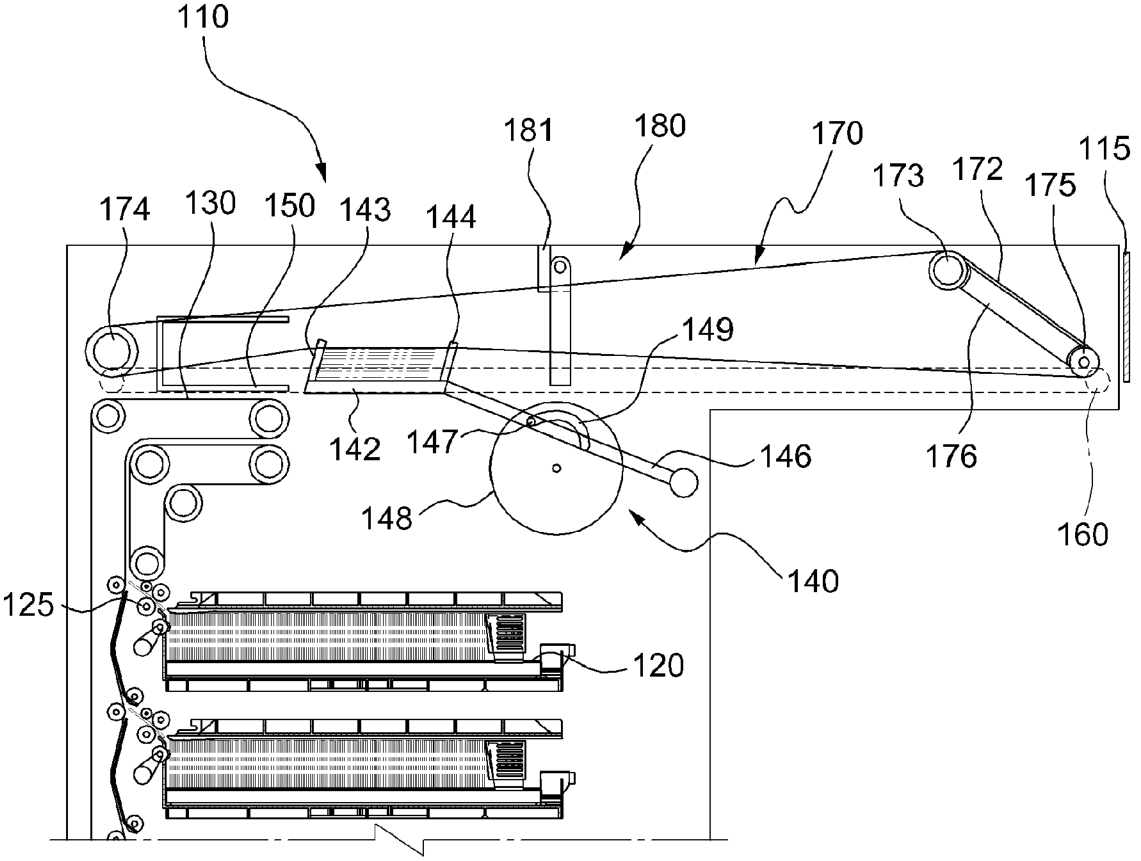
FIG. 3, FIG. 4, FIG. 5, and FIG. 6 are cross-sectional views for describing an operation mechanism of the cash transaction machine of FIG. 1.

As shown in FIG. 3, when a desired amount of paper media is stacked in the supporter 142 of the temporary stack portion 140, the rotation guide 148 may rotate clockwise to lift up the supporter 142. In this instance, the paper media stacked in the supporter 142 may make a contact with the bottom surface of the belt pressing portion 170 and maintain its arranged state by the pressing belt 172.

Figure 4:
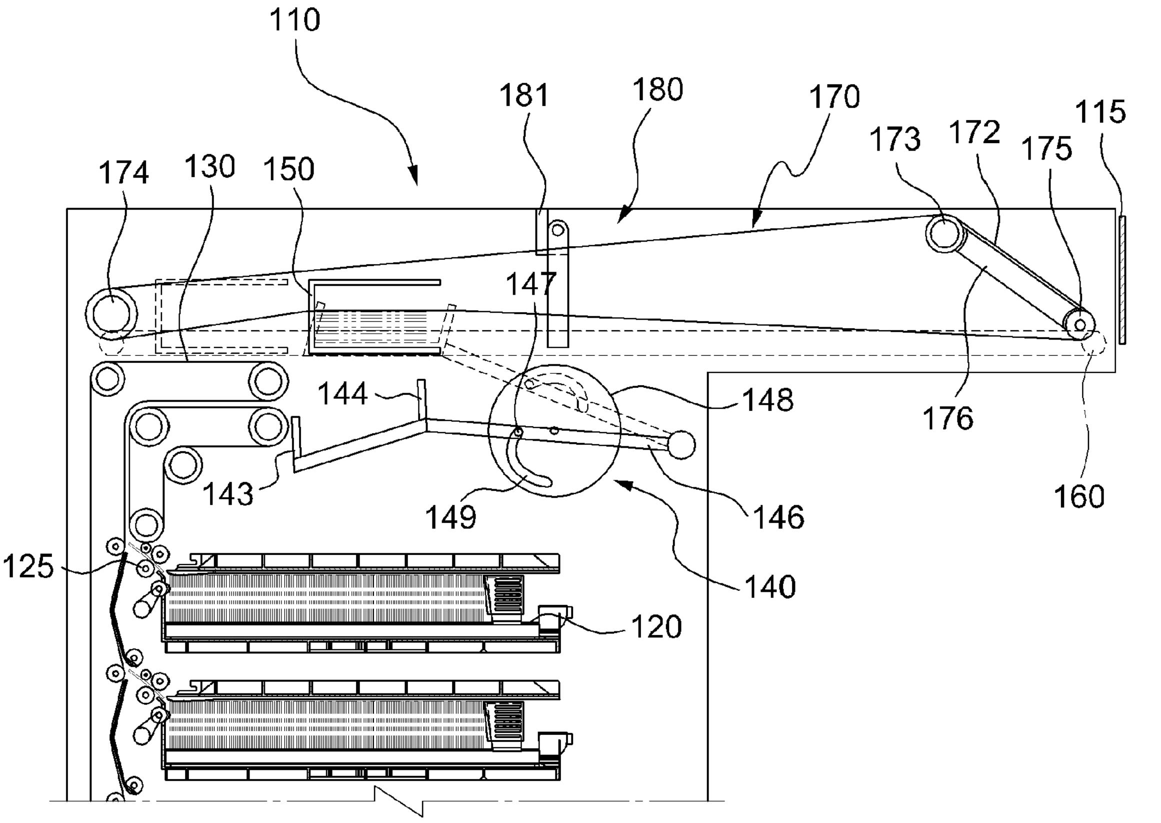

Referring to FIG. 4, the carriage 150 may move forward towards the medium outlet 115 and thereby be overlapped with the supporter 142 of the temporary stack portion 140. In this instance, a lower portion of the carriage 150 may be internally received along a groove of the supporter 142. When the rotation guide 148 rotates counterclockwise whereby the supporter 142 is moved down, only paper media may remain in the carriage 150 and the temporary stack portion 140 may be continuously moved down.

Accordingly, the paper media may be transferred to the carriage 150 and the carriage 150 may continuously move forward towards the medium outlet 115. In this instance, due to the one-way clutch 190, the pressing belt 172 may be in the idle state.

Figure 5:
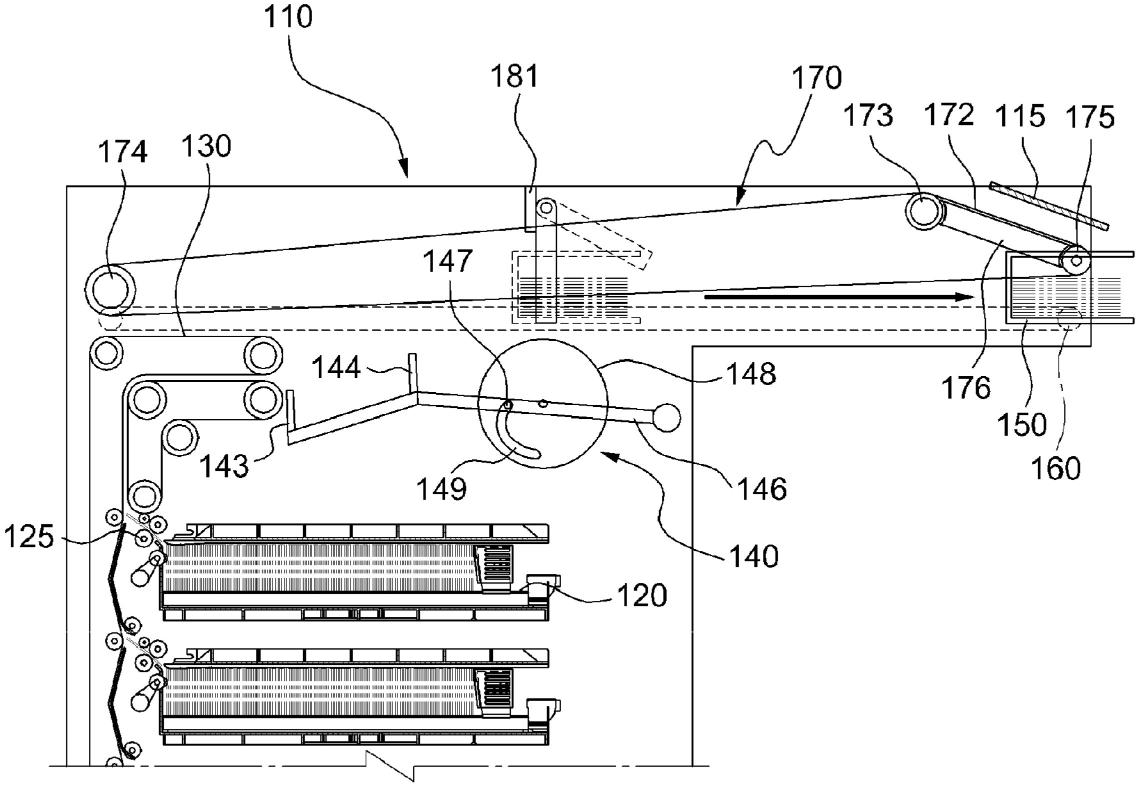

Referring to FIG. 5, the carriage 150 may move forward to the medium outlet 115 together with the paper media. In this instance, although the carriage 150 meets the stopper 180, the carriage 150 may move forward with pushing the stopper 180. Specifically, the stopper 180 may open the travel path of the carriage 150 with performing a pivot motion in the forward direction of the carriage 150 due to the carriage 150.

While the carriage 150 is moving forward to the medium outlet 115, the front moving roller 175 may be moved up whereby a belt droop may occur due to the length of the existing pressing belt 172. When the customer does not collect paper media, the paper media may need to be retrieved. The droop of the pressing belt 172 indicates the pressure by the belt pressing portion 170 is weak, which may interrupt smooth retrieval of paper media.

Figure 6:
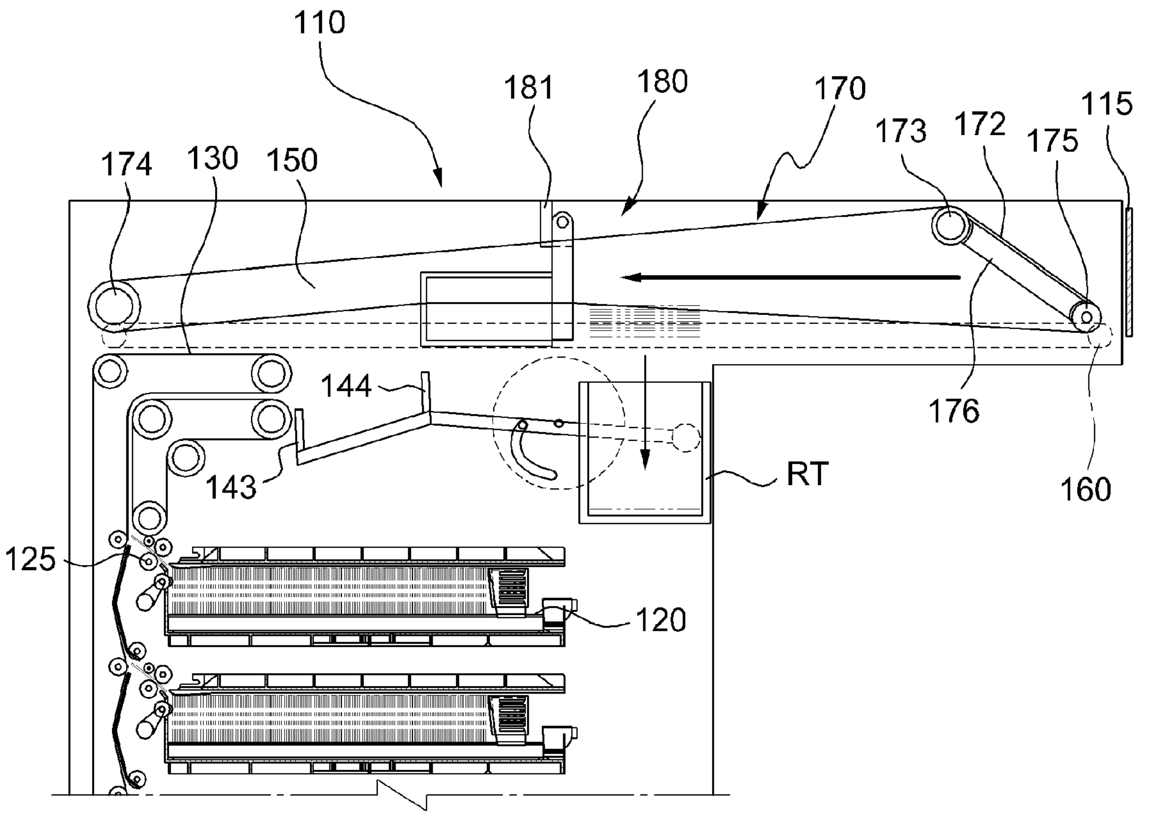

As described above, paper media not collected by the customer may need to be retrieved again. Referring to FIG. 6, the uncollected paper media may be retreated or moved backward again in the state where the paper media is loaded in the carriage 150. In this instance, since the pressing belt 172 and the driving belt 160 are driven together to thereby press the top surface of paper media, it may be possible to maintain the arranged state of paper media.

When the carriage 150 meets the stopper 180 on the way of moving backward, the paper media may be stopped by the stopper 180. This is because the stopper 180 may not perform a pivot motion in the backward direction of the carriage 150 due to the fixing member 181.

Although the paper media is stopped in the stopper 180, the carriage 150 may continuously move backward. Therefore, the paper media may be separated from the carriage 150. The separated paper media may be collected in a retrieval box RT that is provided below the stopper 180.

The carriage 150 with the paper media separated may continuously move backward and be positioned to its original location that may transfer a paper medium again.

Figure 7:
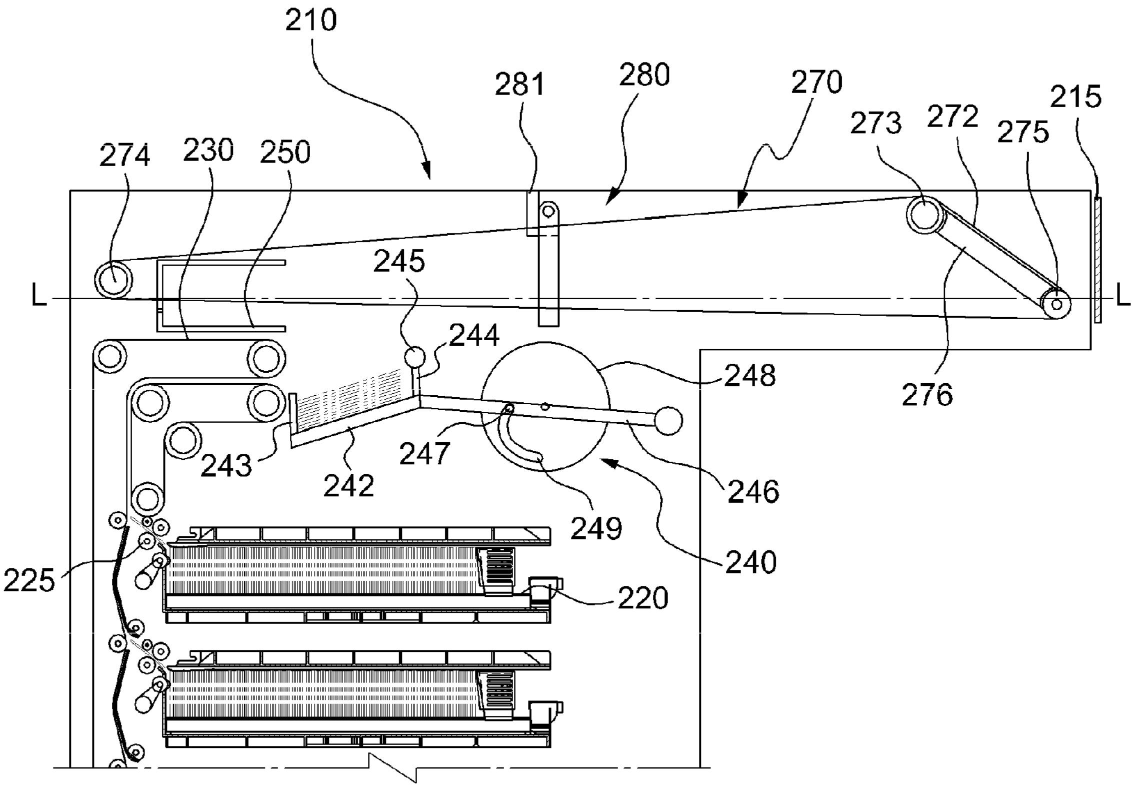
FIG. 7 is a cross-sectional view illustrating a cash transaction machine according to another embodiment of the present invention.

FIG. 7 is a cross-sectional view illustrating a cash transaction machine according to another embodiment of the present invention.

Referring to FIG. 7, the cash transaction machine includes a medium storage portion 220, a medium transfer module 230, a temporary stack portion 240, a carriage 250, and a carriage transfer portion 270 for transferring the carriage 250, which are provided in a housing 210.

The paper medium may be picked up and be supplied in a sheet unit from the medium storage portion 220. The supplied paper medium may be transferred to the temporary stack portion 240 via the medium transfer module 230. Paper media may be supplied in the sheet unit and be stacked in the temporary stack portion 240. When paper media is stacked as many sheets as a customer desires to withdraw, a bundle or a stack of paper media stacked in the temporary stack portion 240 may be transferred to the carriage 250. The stack of paper media transferred to the carriage 250 may move to a medium outlet 215 together with the carriage 250. The customer may collect the paper media from the medium outlet 215 in a stack unit.

In this instance, the carriage transfer portion 270 may transfer the carriage 250 with pressing a top surface of stacked paper media being transferred by the carriage 250. While the paper media is being transferred for payment of the paper media, or while the paper media is not collected by the customer and thus is being retrieved, the carriage transfer portion 270 may press the paper media so that the paper media may not be dispersed and may maintain its stable state. Hereinafter, a function of each constituent element will be further described in detail.

A pickup module 225 may be provided, as an internal type or as an external type, in the medium storage portion 220. The pickup module 225 may pick up the predetermined number of paper media from the medium storage portion 220 in a sheet unit, that is, one by one. Generally, the pickup module 225 may include a pickup roller, a feed roller, a gate roller, a pinch roller, and the like. Those skilled in the art may readily understand a configuration and a function thereof and thus further detailed description related thereto will be omitted here.

A paper medium picked up and supplied from the medium storage portion 220 may be transferred to the temporary stack portion 240 via the medium transfer module 230. In the present embodiment, although the medium transfer module 230 adopts a transfer scheme consisting of a belt and a roller, the medium transfer module 230 may transfer the paper medium according to a transfer scheme using a roller and a guide plate depending on embodiments. The temporary stack portion 240 may be provided to be adjacent to an outlet of the medium transfer module 230. The paper medium may be stacked in the sheet unit in the temporary stack portion 240.

Referring to FIG. 7, the temporary stack portion 240 includes a supporter 242, a front wall 244, a rear wall 243, and a stack elevator. The stack elevator includes a rotation supporter 246 and a rotation guide 248 that performs a cam function. The supporter 242 and the rotation supporter 246 may be integrally formed, and upwardly and downwardly move through a rotary motion of the rotation supporter 146. Specifically, the supporter 242 may be positioned to be adjacent to the outlet of the medium transfer module 230 and may also be positioned in an upwardly moved location for transfer of the carriage 250.

A pressure preventing portion (not shown) or a roller member 245 may be formed in at least one of the front wall 244 and the rear wall 243. The pressure preventing portion or the roller member 245 may be formed in an upper end of the front wall 244 or the rear wall 243 to lift up a belt of the carriage transfer portion 270 when the supporter 242 is moved up.

Here, it is possible to form a curved surface in a portion of the pressure preventing portion or the roller member 245 that may directly make a contact with the belt of the carriage transfer portion 270 and thereby prevent damage to the belt of the carriage transfer portion 270.

The pressure preventing portion or the roller member 245 may be provided only in either the front wall 244 or the rear wall 243, or may also be provided in the rotation guide 248. Also, the pressure preventing portion or the roller member 245 may be provided in the housing 210 to thereby lift up the belt of carriage transfer portion 270 in interoperation with moving up of the supporter 242.

A stack driving unit (not shown) such as a motor and the like may be provided to drive the rotation guide 248.

The front wall 244 and the rear wall 243 may be provided in a front end and a rear end of the supporter 242, respectively. The front wall 244 may stop an advancement of the paper medium being discharged from the medium transfer module 230. When a sheet roller (not shown) is provided in the outlet of the medium transfer module 230, the paper medium may temporarily maintain its stopped state by the front wall 244 and then may be guided to be moved down by the sheet roller. The rear wall 243 may guide paper media to be stacked on the supporter 242 in an arranged state. The supporter 242 may be provided to be downwardly inclined in front of the outlet of the medium transfer module 230.

As shown in the figures, a spiral guide groove 249 having a different radius upon a rotation angle may be formed in the rotation guide 248. A protrusion 247 may be formed in the rotation supporter 246 to be coupled with the guide groove 249. Accordingly, when the rotation guide 248 rotates clockwise based on the figure, the rotation supporter 246 may be moved up. Conversely, when the rotation guide 248 rotates counterclockwise based on the figure, the rotation supporter 246 may be moved down.

Although the present embodiment provides the temporary stack portion 240 constructed as above, the present invention is not limited thereto. Specifically, various types of temporary stack portions may be provided. Also, those skilled in the art may variously select and use a device for elevating the supporter 242 in the related art.

The carriage 250 may be provided in the structure to be partially overlapped with the supporter 242 of the temporary stack portion 240. Generally, the carriage 150 may be provided in a fork shape including a plurality of supporters. When the supporter 242 is moved up to be positioned in an upper location, the carriage 250 may move forward whereby a lower portion of the carriage 250 may be inserted into the supporter 242 to be positioned below the stacked paper media.

The carriage transfer portion 270 may be provided above the carriage 250 or both sides of the carriage 250. The carriage transfer portion 270 may transfer the carriage 250 and press a top surface of the paper medium or a stack of paper media at the same time. The carriage transfer portion 270 may enable the paper media to be transferred in a well-arranged state.

For this, the carriage transfer portion 270 includes a driving belt 272 for simultaneously transferring the carriage 250 and pressing the top surface of paper media in the entire moving section of the carriage 250 and a plurality of guide rollers for defining a travel path of the driving belt 272. Two or more rows of driving belts 272 may be provided in order to stably press the paper media.

The plurality of guide rollers may include a front fixed roller 273, a rear fixed roller 274, and a front moving roller 275 that is vertically swiveled with maintaining a predetermined distance from the front fixed roller 273. A support member 276 may be interposed between the front fixed roller 273 and the front moving roller 275.

Specifically, the support member 276 may be mounted on a rotation shaft of the front fixed roller 276. The front moving roller 275 may be rotatably mounted on an end of the support member 276. Accordingly, the front moving roller 275 may be vertically swiveled together with the support member 276. When the carriage 250 approaches the front moving roller 275, the front moving roller 275 may be moved up together with the support member 276. Conversely, when the carriage 150 is withdrawn from the front moving roller 275, the front moving roller 275 may be moved down.

The driving belt 272 may be stopped without regard to the carriage 250 and may also move by the same displacement as that of movement of the carriage 250 in order to reduce a friction between the driving belt 272 and the paper media.

In addition to the driving belt 272 and the guide rollers 273, 274, and 275, an additional pressing belt (not shown) may be provided to press the paper media. Specifically, the additional pressing belts may be provided in both sides of the driving belt 272.

In this instance, a number of required belts may increase. A separate configuration may be further provided for interoperation between the driving belt 272 and the pressing belts.

According to an embodiment of the present invention, since the carriage 250 is transferred and the paper media is pressed at the same time using the driving belt 272, there is no need to mount an additional pressing belt.

Also, as shown in FIG. 7, the driving belt 272 may be downwardly inclined along a forward direction of the carriage 250 or with respect to the horizontal line. Specifically, when a line L-L of FIG. 7 is the forward direction of the carriage 250 or the horizontal line, a lower portion of the driving belt 272, that is, a portion of pressing the top surface of paper media may be downwardly inclined with respect to the line L-L. By forming the driving belt 272 to be downwardly inclined along the forward direction of the carriage 250, although the driving belt 272 is lifted up by the pressure preventing portion or the roller member 245, it is possible to maintain a minimum contact between the paper media and the driving belt 272.

The force of transferring a stack of paper media to the medium outlet 215 may be a drive force of the carriage 250 and the driving belt 272. The driving belt 272 also functions to press the top surface of paper media. Specifically, to transfer the stack of paper media is not because of the friction between the driving belt 172 and the paper media.

Also, when a paper medium is not withdrawn or is not collected by a customer and thereby remains in the carriage 250, the paper medium may need to be separated from the carriage 250 and be retrieved. For this, a stopper 280 may be provided in the travel path of the carriage 250.

Referring to FIG. 7, the stopper 280 may be provided in the housing 210 to be positioned in the travel path defined by the driving belt 272 and may perform a pivot motion along the forward direction of the carriage 250. Specifically, when the carriage 250 moves forward, a paper medium loaded in the carriage 250 may not be stopped by the stopper 280. When the carriage 250 moves backward, the paper medium loaded in the carriage 250 may be stopped by the stopper 280. Through this, the paper medium may be separated from the carriage 250.

The separated paper medium may be collected in a separately mounted retrieval box (not shown). In this instance, the retrieval box may be provided below the stopper 280.

So that the stopper 280 may perform the pivot motion only in the forward direction of the carriage 250, an upper end of the stopper 280 may be connected to the housing 210 via a hinge. A fixing member 281 may be separately mounted onto one side of the stopper 280 to thereby prevent the stopper 180 from performing the pivot motion when the carriage 250 moves backward.

The stopper 280 may be in the structure of preventing interference with the carriage 250. A lower end of the stopper 280 may be partially overlapped with a medium holding surface of the carriage 250. In this instance, an interference preventing portion (not shown) may be provided in the carriage 250 to prevent a collision or contact between the lower end of the stopper 280 and the carriage 250.

Hereinafter, an operation of a cash transaction machine according to an embodiment of the present invention will be described with reference to FIGS. 8 through 11.

Figure 8:
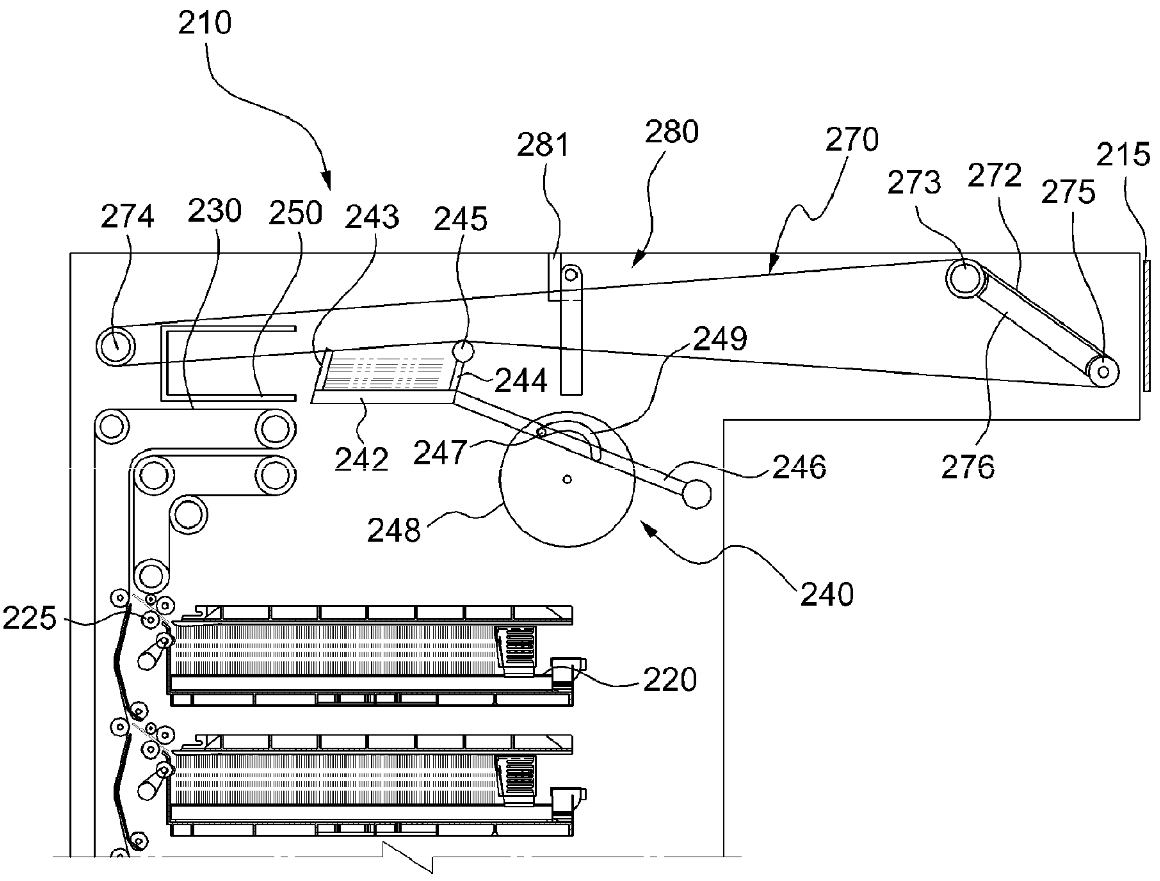
FIG. 8, FIG. 9, FIG. 10, and FIG. 11 are cross-sectional views for describing an operation mechanism of the cash transaction machine of FIG. 7.

As shown in FIG. 8, when a desired amount of paper media is stacked in the supporter 242 of the temporary stack portion 240, the rotation guide 248 may rotate clockwise to lift up the supporter 242. In this instance, the paper media stacked in the supporter 242 may make a contact with the bottom surface of the carriage transfer portion 270 and maintain its arranged state by the driving belt 272. In this instance, the driving belt 272 may be in a slightly lifted-up state due to the pressure preventing portion or the roller member 245 provided in the temporary stack portion 240. Therefore, it may prevent the top surface of paper media loaded in the supporter 242 of the temporary stack portion 240 from being excessively pressed by the driving belt 272, or may prevent a friction from occurring between the driving belt 272 and the paper media.

Conversely, when the pressure preventing portion and the roller member 245 are not provided, and the temporary stack portion 240 is moved up, the driving belt 272 may press the top surface of paper media loaded in the supporter 242. When the driving belt 272 is driven to advance the carriage 250 towards the supporter 242, the friction may occur between the driving belt 272 and the paper media to thereby disperse the paper media.

Figure 9:
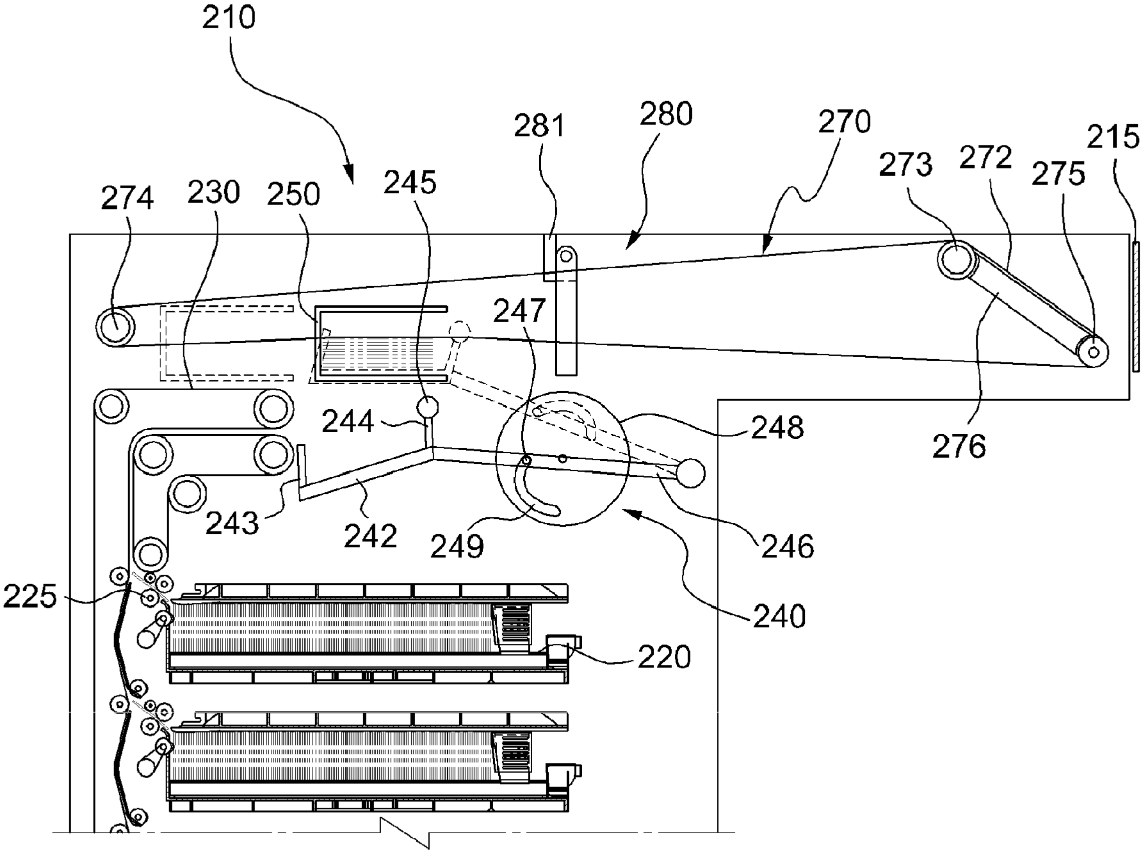

Referring to FIG. 9, the carriage 250 may move forward towards the medium outlet 215 and thereby be overlapped with the supporter 242 of the temporary stack portion 240. In this instance, a lower portion of the carriage 250 may be internally received along a groove of the supporter 242. When the rotation guide 248 rotates counterclockwise whereby the supporter 242 is moved down, only paper media may remain in the carriage 250 and the temporary stack portion 240 may be continuously moved down.

Accordingly, the paper media may be transferred to the carriage 250 and the carriage 250 may continuously move forward towards the medium outlet 215.

Figure 10:
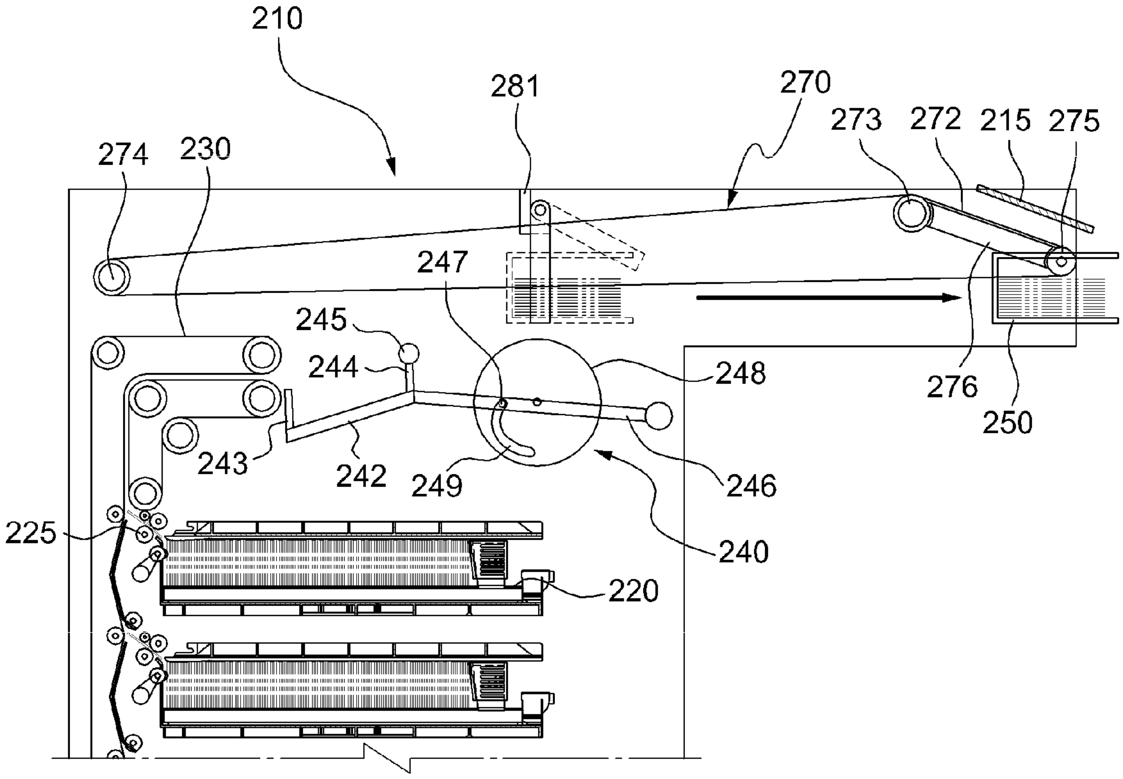

Referring to FIG. 10, the carriage 250 may move forward to the medium outlet 215 together with the paper media. In this instance, although the carriage 250 meets the stopper 280, the carriage 250 may move forward with pushing the stopper 280. Specifically, the stopper 280 may open the travel path of the carriage 250 with performing a pivot motion in the forward direction of the carriage 250 due to the carriage 250.

While the carriage 250 is moving forward to the medium outlet 215, the front moving roller 275 may be moved up whereby a belt droop may occur due to the length of the existing driving belt 272. When the customer does not collect paper media, the paper media may need to be retrieved. The droop of the driving belt 272 indicates the pressure by the carriage transfer portion 270 is weak, which may interrupt smooth retrieval of paper media.

Figure 11:
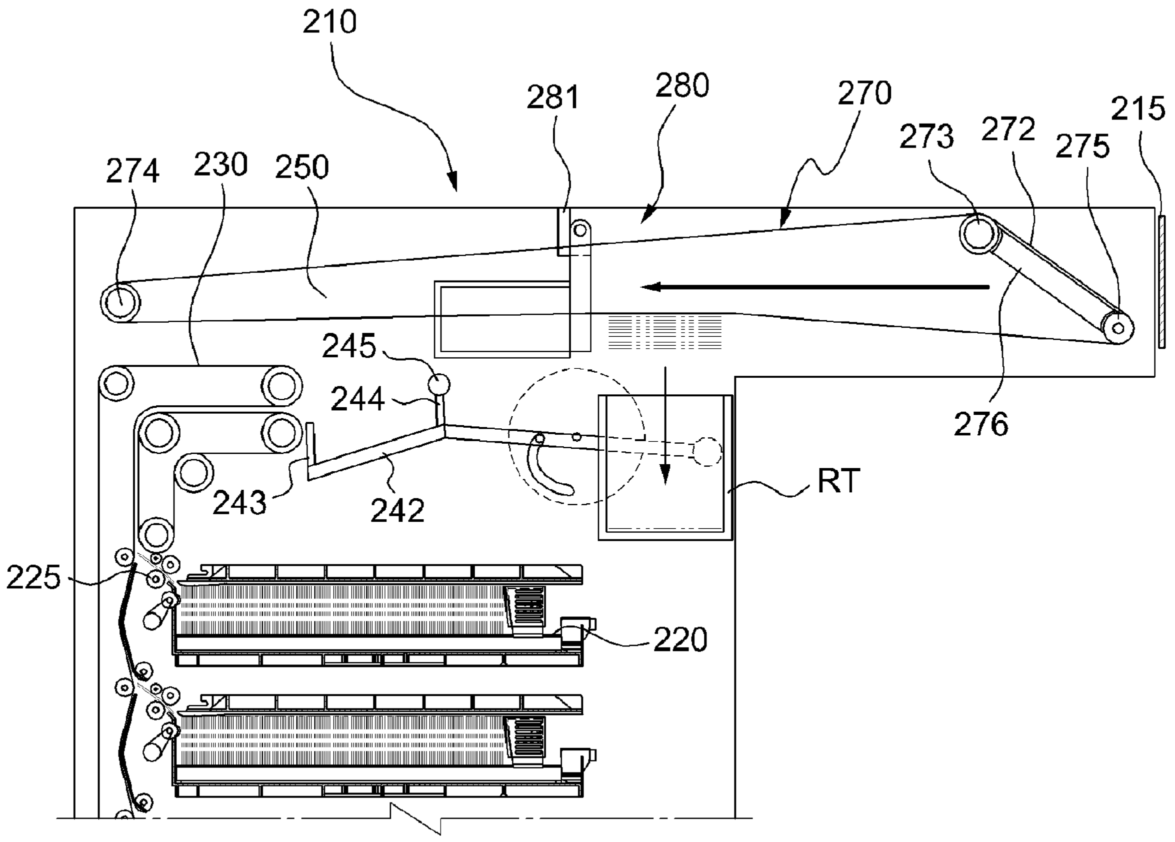

As described above, paper media not collected by the customer may need to be retrieved again. Referring to FIG. 11, the uncollected paper media may be retreated or moved backward again in the state where the paper media is loaded in the carriage 250. Since the driving belt 272 moves backward pressing the top surface of paper media, it may be possible to maintain the arranged state of the paper media.

When the carriage 250 meets the stopper 280 on the way of moving backward, the paper media may be stopped by the stopper 280. This is because the stopper 280 may not perform a pivot motion in the backward direction of the carriage 250 due to the fixing member 281.

Although the paper media is stopped in the stopper 280, the carriage 250 may continuously move backward. Therefore, the paper media may be separated from the carriage 250. The separated paper media may be collected in a retrieval box RT that is provided below the stopper 280.

The carriage 250 with the paper media separated may continuously move backward and be positioned to its original location that may transfer a paper medium again.

As described above, according to embodiments of the present invention, while paper media stacked in a temporary stack portion is being loaded to a carriage, a pressing belt may not be driven using a one-way clutch. Therefore, it is possible to prevent a friction from occurring between the pressing belt and the paper media and thereby to maintain a loaded state of the paper media and to prevent a jam phenomenon from occurring while transferring the paper media.

Also, according to embodiments of the present invention, when retrieving uncollected paper media, it is possible to drive a pressing belt to thereby prevent the paper media from not being retrieved due to a friction between the pressing belt and the paper media.

Also, according to embodiments of the present invention, it is possible to simplify a retrieval processing structure of uncollected paper media in a cash transaction machine using a stopper.

Also, according to embodiments of the present invention, while paper media stacked in a temporary stack portion is being loaded to a carriage, it is possible to move up a driving belt using a pressure preventing portion or a roller member provided in the temporary stack portion. Therefore, it is possible to prevent a friction from occurring between the driving belt and the paper media. Also, it is possible to maintain a loaded state of the paper media and to prevent a jam phenomenon from occurring while transferring the paper media.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A cash transaction machine comprising:

a temporary stack portion configured to receive a stack of paper media from a storage portion located below the temporary stack portion and moving the stack of paper media from a first position to a second position;

a carriage configured to receive the stack of paper media at the second position from the temporary stack portion;

a driving belt configured to transfer the carriage loaded with the stack of paper media to a medium outlet;

a pressing belt configured to press the paper medium loaded in the carriage in cooperation with the driving belt;

a plurality of guide rollers provided along a travel path of the carriage to define a travel path of the driving belt and a travel path of the pressing belt; and a one-way clutch configured to control interlocking state between the driving belt and the pressing belt, the one-way clutch configured to allow relative movement between the pressing belt and the paper medium while loading the stack of paper media from the temporary stack portion to the carriage, wherein, when the carriage moves towards the medium outlet, the one-way clutch is configured not to interlock the pressing belt with the driving belt, and when the carriage moves away from the medium outlet, the one-way clutch is configured to interlock the pressing belt with the driving belt.

2. The cash transaction machine of claim 1, wherein the plurality of guide rollers comprise a front fixed roller, a rear fixed roller, and a front moving roller that is vertically swiveled with maintaining a predetermined distance from the front fixed roller, and the front moving roller upwardly and downwardly moves in correspondence to forward or backward of the carriage.

3. The cash transaction machine of claim 1, wherein the pressing belt is provided in parallel with the driving belt at a predetermined interval, and each of the driving belt and the pressing belt is provided in at two rows.

4. The cash transaction machine of claim 1, wherein the carriages is synchronized with the driving belt to move together with the driving belt.

5. The cash transaction machine of claim 1, further comprising:

a stopper retrieving the paper medium loaded in the carriage that is moving backward from the medium outlet.

6. The cash transaction machine of claim 5, wherein the stopper is positioned in a path defined by the driving belt to perform a pivot motion in a forward direction of the carriage.

7. The cash transaction machine of claim 5, wherein, when the carriage moves forward, the paper medium loaded in the carriage is not stopped by the stopper, and when the carriage moves backward, the paper medium loaded in the carriage is stopped by the stopper.

8. A cash transaction machine comprising:

a medium storage portion;

a medium transfer module configured to transfer individual sheets of paper media from the medium storage portion;

a temporary stack portion comprising a vertically movable supporter adjacent to an outlet of the medium transfer module, the movable supporter configured to receive and stack the individual sheets of paper media;

a carriage configured to receive the stacked paper media from the supporter;

a driving belt configured to transfer the carriage loaded with the stacked per media to a medium outlet; and a pressure preventing portion configured to prevent the stack of paper media from being pressed by the driving belt while loading the stack of paper media from the supporter to the carriage.

9. The cash transaction machine of claim 8, wherein the carriage is synchronized with the driving belt to move together with the driving belt, and at least two rows of driving belts are provided.

10. The cash transaction machine of claim 8, wherein the pressure preventing portion is a roller member formed in the supporter, and the driving belt presses the paper medium of the carriage after the supporter is moved down.

11. The cash transaction machine of claim 10, wherein:

the temporary stack portion comprises a stack driving unit and a stack elevator transferring the supporter from the outlet of the medium transfer module to a path defined by the driving belt using the stack driving unit and the roller member makes a contact with the driving belt when the supporter is moved up by the stack elevator.

12. A cash transaction machine comprising:

a medium storage portion;

a medium transfer module configured to transfer individual sheets of paper media from the medium storage portion;

a temporary stack portion comprising a vertically movable supporter adjacent to an outlet of the medium transfer module, the movable supporter configured to receive and stack the individual sheets of paper media;

a carriage configured to receive the stacked paper media from the supporter;

a driving belt configured to move synchronously with the carriage to transfer the carriage to a medium outlet, the driving belt slanted downward towards a forward direction of the carriage; and a plurality of guide rollers along a travel path of the carriage to define a travel path of the driving belt, wherein a roller member is formed in the supporter to prevent the stack of paper media from being pressed by the driving belt or to prevent friction from occurring between the driving belt and the paper medium while loading the stacked paper media from the supporter to the carriage, wherein the driving belt resumes pressure on the stack of paper media of the carriage after the supporter moves away from the carriage.

13. The cash transaction machine of claim 12, wherein the plurality of guide rollers comprise a front fixed roller, a rear fixed roller, and a front moving roller that is vertically swiveled with maintaining a predetermined distance from the front fixed roller, and the front moving roller upwardly and downwardly moves in correspondence to forward or backward of the carriage.

14. The cash transaction machine of claim 12, further comprising:

a stopper retrieving the paper medium loaded in the carriage that is moving backward from the medium outlet.

15. The cash transaction machine of claim 14, wherein the stopper is positioned in a path defined by the driving belt to perform a pivot motion in a forward direction of the carriage.

16. The cash transaction machine of claim 14, wherein, when the carriage moves forward, the paper medium loaded in the carriage is not stopped by the stopper, and when the carriage moves backward, the paper medium loaded in the carriage is stopped by the stopper.

* * * * *

UNITED STATES PATENT AND TRADEMARK OFFICE

CERTIFICATE OF CORRECTION

PATENT NO. : 8,047,428 B2
APPLICATION NO. : 12/342676
DATED : November 1, 2011
INVENTOR(S) : Je Seok Kong et al.

It is certified that error appears in the above-identified patent and that said Letters Patent is hereby corrected as shown below:

IN THE CLAIMS:

In Column 14, Line 17, Claim 8, replace “per” with --paper--.

Signed and Sealed this
Seventeenth Day of January, 2012

David J. Kappos

David J. Kappos
*Director of the United States Patent and Trademark Office*